(No Model.)
E. R. THOMAS & G. COWDERY.
Car Coupling.
No. 243,474.                    Patented June 28, 1881.
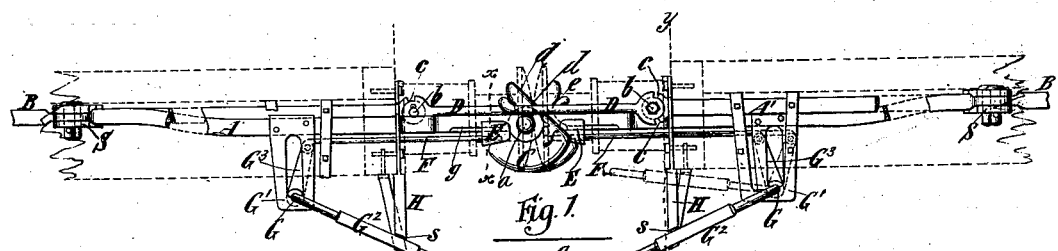
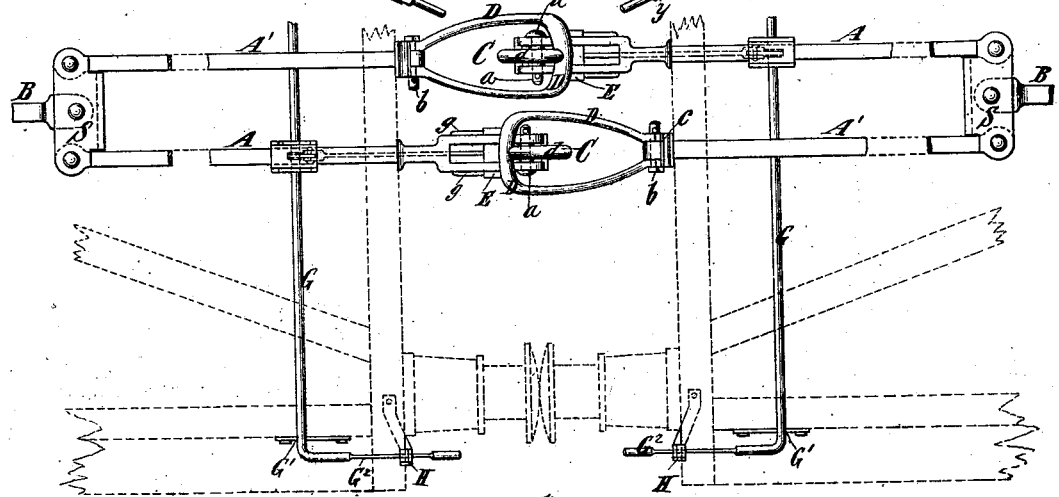
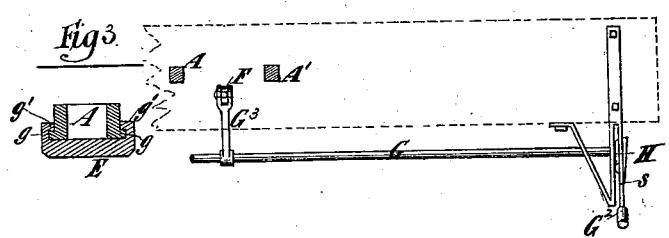   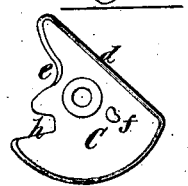
Witnesses:—
Fredt Haynes
Ed. Glatzmayer
Inventor:—
Edwin R Thomas
George Cowdery
by their Attorneys
Brown & Brown
N. PETERS, Photo-Lithographer, Washington, D. C.

UNITED STATES PATENT OFFICE.

EDWIN R. THOMAS AND GEORGE COWDERY, OF SYDNEY, NEW SOUTH WALES, ASSIGNORS OF ONE-THIRD TO HUDSON BROTHERS, OF SAME PLACE.

CAR-COUPLING.

SPECIFICATION forming part of Letters Patent No. 243,474, dated June 28, 1881.

Application filed May 16, 1881. (No model.) Patented in New South Wales August 13, 1880, in Victoria September 13, 1880, in South Australia September 20, 1880, in Tasmania September 21, 1880, in New Zealand October 18, 1880, and in Queensland November 12, 1880.

*To all whom it may concern:*

Be it known that we, EDWIN ROBINS THOMAS and GEORGE COWDERY, both of Sydney, in the Colony of New South Wales, have invented certain new and useful Improvements in Couplings for Rolling-Stock for Railways, Tramways, &c., of which the following is a specification.

The principal object of our invention is to provide a simple and secure coupling for railway and other rolling-stock, which may be automatically coupled without the necessity of going between the cars, and which, when unlocked from the side of the car, will readily uncouple.

Our invention consists in the combination, with two draw-bars, of a link or open loop pivoted to one draw-bar, and projecting beyond the end thereof, and a hook pivoted to the other draw-bar, and having an inclined face upon which said link or loop may ride as the two draw-bars are brought together, and weighted below its pivot, so as to automatically return to a locking position, and a locking piece or bolt for preventing the turning of said hook. When the locking piece or bolt is moved to release the hook, and a strain in opposite directions is applied to the draw-bars, said hook will turn upon its pivot, releasing the said link or loop, and will then by its weight tumble or return to its normal position. We also preferably provide the said hook with a stop for preventing its turning as the link or loop rides up on its inclined face, and we also provide stops which permit said link or loop to be moved both above and below a horizontal position, but which preclude undue movement thereof.

Although a single coupling of the kind described may suffice, we prefer to employ two such couplings between each two cars, each car having upon each end two draw-bars, one carrying a link or loop and the other a tumbling-hook, which engage, respectively, with a similar hook and link or loop upon the draw-bars of the adjacent cars.

In the accompanying drawings, Figure 1 represents a plan of two pairs of draw-bars connected by our improved coupling and a dotted outline of a portion of the car-body. Fig. 2 represents a side view thereof and a dotted outline of a portion of said car-body. Fig. 3 represents a transverse section, upon a larger scale, on the dotted line $x\ x$, Fig. 2. Fig. 4 represents a side view of one of the tumbling-hooks detached from other parts, and upon the same scale as Fig. 3; and Fig. 5 represents a section upon the dotted line $y\ y$, Fig. 2.

Similar letters of reference designate corresponding parts in all the figures.

A A' designate a pair of draw-bars with which each car is provided, and which are placed opposite similar draw-bars, A' A, upon an adjacent car. Each pair of draw-bars are connected by pivots or pins with a cross-piece, S, with which is connected a bar or link, B, which may have a swinging or pivotal connection with the car-body. Each of the draw-bars A is bifurcated or forked at its outer end, and has fitted within it a hook, C, which is pivoted upon a pin, $a$, and the lower portion of which (or the portion below the pivot) is weighted, so as to always tend downward.

To each of the draw-bars A' is secured by a pin, $b$, a link or open loop, D, and the draw-bar and link are each constructed at said pivot with shoulders $c$, which prevent the said link from being moved too far above or below a horizontal plane. The front or upper face, $d$, of each hook is inclined, and as the cars are brought together the loop or link D rides up on the inclined face of the opposite hook, and when it passes the point thereof drops and fits into a notch or depression, $e$.

In order to prevent the hook from being tilted backward as the link or loop rides upon said incline, said hook is provided with a pin or stud, $f$, projecting from its side, which engages with the end of the draw-bar, as shown in Fig. 2.

If the hook C be not locked in any way, a strain upon the draw-bars A A or A' A' in opposite directions will turn the hook forward upon its pivot and release the link or loop, and to prevent this we provide a latch or lock for preventing the accidental turning or tumbling of the hook.

The draw-bars A have ribs $g$, projecting from their sides; and E designates a piece provided with inwardly-projecting lips, $g'$, which engage said ribs, and which may be moved thereon so as to enter notches $h$ in the rear face of the hooks C, thus securely locking said hooks until the latches E are moved back out of said notches. The said pieces E may be moved outward or backward by means of rods F, to which they are connected.

G designates rock-shafts, extending entirely across the adjacent end portions of the two cars, and adapted to be rocked or turned in bearings $G'$. Each of said rock-shafts is provided upon each end with a lever or arm, $G^2$, whereby it may be turned or rocked, and of which one only is represented on each shaft. Upon each rock-shaft is fixed an arm or lever, $G^3$, which at its outer end is connected with the rod F, and hence it will be understood that by oscillating or raising either of the arms $G^2$ the rock-shaft G, to which it is fixed, will be turned or rocked and the bolt or latch E withdrawn from the notch $h$, in the hook C.

H designates guides, which are bolted to the side of the car-body, and in which the levers $G^2$ are adapted to be moved up and down. In the lower part of each guide H is a shoulder, $s$, which forms a catch, and the lever $G^2$, fitting therein, is slightly elastic, and naturally, when pushed down, springs under the catch $s$, and is retained there until drawn laterally to one side to free it therefrom. Hence, whenever one of the levers $G^2$ is pushed down to the level of the catch $s$ it springs under the said catch, and thus holds the locking-piece or bolt E securely in engagement with the notch $e$ in the hook with which it engages.

Although we have represented two pairs of draw-bars, a single pair might suffice between each two cars.

By our invention we provide a simple and reliable coupling, which is not liable to get out of order, and by which cars may be easily and quickly coupled or uncoupled without going between them.

What we claim as our invention, and desire to secure by Letters Patent, is—

1. The combination, with two draw-bars, of a link or open loop pivoted to one draw-bar and projecting beyond the end thereof, a hook pivoted to the other draw-bar, and having an inclined face upon which said link or loop may ride as the two draw-bars are brought together, and weighted below its pivot, so as to return to a locking position, and a locking piece or bolt for securing said hook from turning, substantially as specified.

2. The combination, with two pairs of draw-bars, A A A′ A′, of weighted tumbling-hooks C pivoted to the draw-bars A, and having inclined front faces, $d$, links or loops D, pivoted to and projecting beyond the end of the draw-bars A′, and each adapted to engage with hooks C upon the opposite draw-bars, A A, and locking pieces or bolts for said hooks, substantially as specified.

3. The combination, with two draw-bars, of a link or open loop pivoted to one draw-bar and projecting beyond the end thereof, a weighted tumbling-hook, pivoted to the other draw-bar, and having an inclined face or front, a stop upon said hook for preventing backward movement of said hook as the link or loop rides up on it, and a locking piece or bolt for securing said hook against turning in either direction, substantially as specified.

4. The combination, with two draw-bars, of a link or open loop pivoted to one draw-bar and projecting beyond the end thereof, a weighted tumbling-hook, pivoted to the other draw-bar, and having an inclined face or front and a notch in its edge, a longitudinally-movable locking piece or bolt for entering said notch, a rock-shaft provided with two arms, one of which is connected with said locking piece or bolt, and the other of which may be operated to turn said rock-shaft for moving said locking-piece to release said hook, substantially as specified.

EDWIN R. THOMAS.
GEORGE COWDERY.

Witnesses:
JAMES YOUNG,
HENRY HALLORAN.